United States Patent
Kemmer

(10) Patent No.: US 12,066,153 B2
(45) Date of Patent: Aug. 20, 2024

(54) METHOD FOR FILLING A HYDROGEN TANK OF A MOTOR VEHICLE COMPRISING A FUEL CELL DRIVE AND MOTOR VEHICLE

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 17/794,020

(22) PCT Filed: Dec. 23, 2020

(86) PCT No.: PCT/EP2020/087782
§ 371 (c)(1),
(2) Date: Jul. 20, 2022

(87) PCT Pub. No.: WO2021/148221
PCT Pub. Date: Jul. 29, 2021

(65) Prior Publication Data
US 2023/0038507 A1   Feb. 9, 2023

(30) Foreign Application Priority Data
Jan. 22, 2020   (DE) ............... 10 2020 200 691.1

(51) Int. Cl.
*F17C 5/06*   (2006.01)

(52) U.S. Cl.
CPC ........ *F17C 5/06* (2013.01); *F17C 2205/0332* (2013.01); *F17C 2221/012* (2013.01);
(Continued)

(58) Field of Classification Search
CPC ............... F17C 5/06; F17C 2205/0332; F17C 2221/012; F17C 2223/0123;
(Continued)

(56) References Cited

U.S. PATENT DOCUMENTS

| | | | |
|---|---|---|---|
| 2012/0060935 A1* | 3/2012 | Carter | F02D 19/023 137/511 |
| 2014/0216599 A1* | 8/2014 | Loewenthal | F17C 5/00 141/4 |

(Continued)

FOREIGN PATENT DOCUMENTS

| | | |
|---|---|---|
| DE | 102016217341 A1 | 3/2018 |
| JP | 2013200020 A | 10/2013 |
| WO | 2017158762 A1 | 9/2017 |

OTHER PUBLICATIONS

SAE International Surface Vehicle Standard J2601, Jul. 2014 edition (Year: 2014).*

(Continued)

*Primary Examiner* — Timothy L Maust
*Assistant Examiner* — Christopher M Afful
(74) *Attorney, Agent, or Firm* — Michael Best & Friedrich LLP

(57) ABSTRACT

The invention relates to a method for filling a hydrogen tank (2) of a motor vehicle (1) comprising a fuel cell drive, wherein the method comprises the steps: (a) determining a first operating time at which the motor vehicle (1) is to be started up and an expected first operating location at which the motor vehicle (1) is to be started up, (b) ascertaining a predicted maximum ambient temperature ($T_{U,max}$) at the first operating location at the first operating time, and (c) filling the hydrogen tank with hydrogen (3) until a tank pressure (p) in the hydrogen tank (2) reaches a maximum permissible tank pressure ($p_{max}$) at a tank temperature (T), wherein the following applies for the tank temperature (T): tank temperature (T)=[maximum ambient temperature ($T_{U,max}$); maximum ambient temperature ($T_{U,max}$)+10 K]. The invention relates further to a motor vehicle (1) comprising a hydrogen tank (2), a fuel cell drive and a control system (5)

(Continued)

for controlling filling of the hydrogen tank (2), wherein the control system (5) to carry out the method.

19 Claims, 2 Drawing Sheets

(52) U.S. Cl.
CPC ............... *F17C 2223/0123* (2013.01); *F17C 2225/0123* (2013.01); *F17C 2250/032* (2013.01); *F17C 2250/043* (2013.01); *F17C 2250/0439* (2013.01); *F17C 2260/021* (2013.01); *F17C 2260/023* (2013.01); *F17C 2265/065* (2013.01)

(58) Field of Classification Search
CPC ........ F17C 2225/0123; F17C 2250/032; F17C 2250/043; F17C 2250/0439; F17C 2260/021; F17C 2260/023; F17C 2265/065

USPC .......................................................... 141/1
See application file for complete search history.

(56) References Cited

U.S. PATENT DOCUMENTS

| 2018/0094772 | A1 | 4/2018 | Santos et al. |
| 2018/0259127 | A1 | 9/2018 | Manousiouthakis et al. |
| 2019/0016312 | A1* | 1/2019 | Carlson ................ G05D 1/0088 |
| 2019/0248228 | A1* | 8/2019 | Wallengren ........... F02D 19/027 |
| 2019/0271275 | A1 | 9/2019 | Pifher et al. |

OTHER PUBLICATIONS

Translation of International Search Report for Application No. PCT/EP2020/087782 dated Apr. 23, 2021 (2 pages).

* cited by examiner

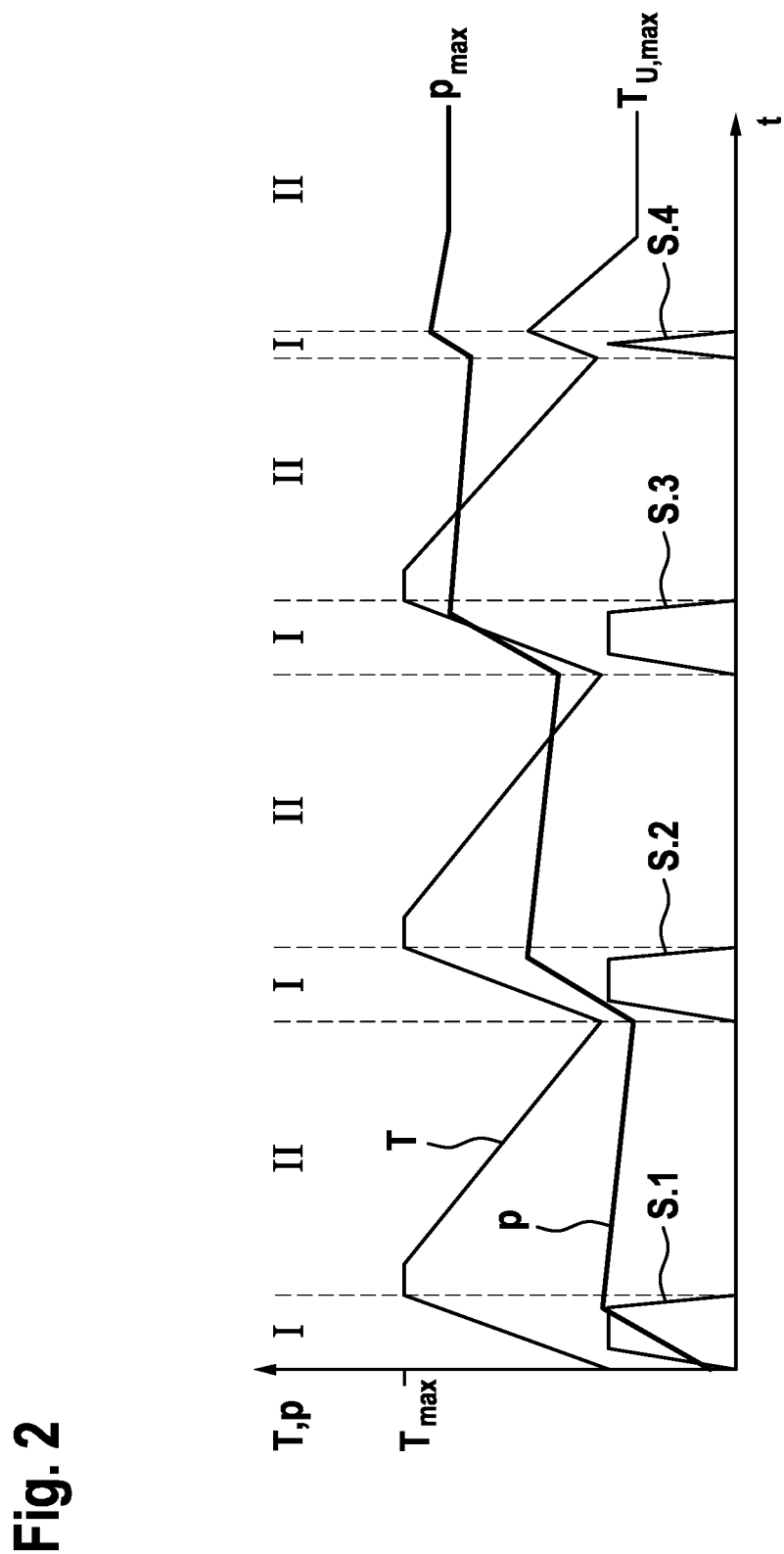

METHOD FOR FILLING A HYDROGEN TANK OF A MOTOR VEHICLE COMPRISING A FUEL CELL DRIVE AND MOTOR VEHICLE

BACKGROUND OF THE INVENTION

The fill quantity of a hydrogen tank depends on the maximum permissible tank pressure in the hydrogen tank. The tank pressure is in turn dependent on the temperature of the hydrogen in the hydrogen tank. The tank pressure thus increases when the ambient temperature rises.

Consequently, a motor vehicle with a hydrogen tank is usually not filled with a desirably high fill quantity, for example the maximum fill quantity for the current ambient temperature, because the tank pressure would exceed the maximum permissible tank pressure if the temperature of the hydrogen were to increase, for example as a result of a rise in the ambient temperature.

Accordingly, it is known to fill the hydrogen tank only to the extent that a tank pressure remains below the maximum permissible tank pressure even at very high ambient temperatures.

SUMMARY OF THE INVENTION

According to a first aspect, the invention relates to a method for filling a hydrogen tank of a motor vehicle comprising a fuel cell drive, wherein the method comprises the steps: (a) determining a first operating time at which the motor vehicle will be started up and a first operating location at which the motor vehicle will be started up, (b) ascertaining a predicted maximum ambient temperature at the first operating location at the first operating time, and (c) filling the hydrogen tank with hydrogen until a tank pressure in the hydrogen tank reaches a maximum permissible tank pressure at a tank temperature, wherein the following applies for the tank temperature: tank temperature=[maximum ambient temperature; maximum ambient temperature+10 K].

In particular, the following can apply for the tank temperature: tank temperature=[maximum ambient temperature; maximum ambient temperature+5 K] or tank temperature=[maximum ambient temperature; maximum ambient temperature+2 K]. In other words, the hydrogen tank is filled only to the extent that the tank temperature corresponds at least to the maximum ambient temperature and at most to the maximum ambient temperature plus 10 K, in particular plus 5 K and further in particular plus 2 K.

Accordingly, it is possible with the method according to the invention to maximize the fill quantity of the hydrogen tank on filling before a later planned start-up of the motor vehicle. By means of the method according to the invention, the hydrogen tank is thereby filled to the maximum taking account of the conditions at the later start-up. The range is thereby increased and the number of refueling operations required is reduced.

For example, the motor vehicle can be refueled by the method according to the invention in the evening or overnight, wherein the first operating time is in the morning of the following day. Accordingly, the temperatures during the night are lower and the hydrogen tank must not be filled to the maximum because otherwise, on the morning of the following day, when the temperature is higher than during the night, the tank pressure would exceed the maximum permissible tank pressure.

However, by means of the predicted maximum ambient temperature, a safety factor that is improbable and far too high, that is to say a possible ambient temperature that is too high, does not have to be taken into account in order to avoid the tank pressure exceeding the maximum permissible tank pressure. Rather, it is sufficient to predict the ambient temperature at the first operating location, that is to say the use location, and at the first operating time, that is to say at the use time. The safety factor can thereby be 10 K, in particular 5 K or 2 K, above the predicted maximum ambient temperature.

The predicted maximum ambient temperature can be provided, for example, by means of known weather data or weather forecasts. The weather data or weather forecasts can be acquired, for example, via the internet. Alternatively or additionally, ambient temperatures measured at the vehicle on the days preceding that time and at the location can be used.

The first operating time and the first operating location can be defined, for example, manually by the vehicle user. This can take place by means of inputting at the motor vehicle. Alternatively or additionally, it can take place by means of an interface of the motor vehicle with an external device, for example a smartphone, of the vehicle user. The smartphone can have a calendar which can be read by the motor vehicle. Accordingly, the motor vehicle can be adapted to provide the first operating time and the first operating location automatically on the basis of data of the external device, for example the calendar of the smartphone. The first operating location can also be ascertained by means of GPS data. Additionally or alternatively, the first operating time and the first operating location can be fixed by the motor vehicle. Furthermore, it can be provided that the first operating time and the first operating location are ascertained by the motor vehicle on the basis of a use profile of the motor vehicle. In other words, a learning algorithm can be provided, by means of which the motor vehicle learns and ascertains the operating time and operating locations of the vehicle user.

The maximum permissible tank pressure is dependent on the hydrogen tank. The maximum permissible tank pressure can be, for example, 875 bar.

It is preferred that the tank temperature corresponds to the predicted maximum ambient temperature or corresponds substantially to the predicted maximum ambient temperature. That the tank temperature corresponds substantially to the predicted maximum ambient temperature includes technical and/or slight deviations of up to 1 K. As a result, the hydrogen tank can be filled to the maximum taking account of the predicted maximum ambient temperature. The range of the motor vehicle comprising the fuel cell drive is thus maximized.

It is further preferred that the method further comprises the step: relieving the pressure in the hydrogen tank if it is determined that the tank pressure will exceed the maximum permissible tank pressure. A solution is thus provided should a scenario occur in which the tank pressure will unexpectedly exceed the maximum permissible tank pressure. Damage to the hydrogen tank can thus be avoided.

Such a scenario can be, for example, that the weather and thus the actual ambient temperature at or before the first operating time and/or at the first operating location change contrary to the prediction. Another example of such a scenario can be that the expected operating time is pushed back or the vehicle is not started up. The ambient temperature can then rise above the predicted maximum ambient temperature and likewise cause the tank pressure to increase above the maximum permissible tank pressure.

It is thereby preferred that it is ascertained whether the ambient temperature will exceed the tank temperature before the motor vehicle is started up, in order to determine whether the tank pressure will exceed the maximum permissible tank pressure. Alternatively or additionally, it is possible actively to monitor the tank pressure in order to determine whether it is likely to be exceeded. For example, such a determination can take place in that a limit of a predetermined tank pressure, which is just below the maximum permissible tank pressure, is exceeded. Both determinations make it possible to react to any changes, for example in the weather, or the first operating time being passed without the vehicle being started up.

It is thereby possible that the pressure is relieved by starting up the fuel cell drive of the motor vehicle without the motor vehicle being moved. The motor vehicle can thus be air-conditioned for later operation, for example. Alternatively or additionally, at least a seat heater can be operated, the front windows and/or side-view mirrors can be defrosted and/or software updates can be installed. In this respect, operation of the motor vehicle or start-up of the motor vehicle includes operating the fuel cell drive with hydrogen from the hydrogen tank. The excess hydrogen introduced into the tank contrary to the prediction can thus be used efficiently without the maximum permissible tank pressure being exceeded.

In particular, it is thereby preferred that the pressure is relieved by starting up the fuel cell drive in order to charge a battery of the motor vehicle. Accordingly, in order to reduce the tank pressure, the excess hydrogen introduced into the tank can simply and advantageously be used for charging the battery of the vehicle.

Alternatively or additionally, it is preferred that the pressure is relieved by discharging hydrogen from the hydrogen tank. A purge valve of the hydrogen tank can be used for this purpose. The discharged hydrogen can be diluted with an air-mass flow. This variant for relieving the pressure is particularly simple and therefore does not require complex control and programming.

Further alternatively or additionally, it is preferred that the motor vehicle is an autonomous motor vehicle and the pressure is relieved by driving the motor vehicle autonomously. Such trips can be empty trips and/or driving-service trips. In the case of empty trips, the motor vehicle travels without passengers. In the case of driving-service trips, passengers are transported by the motor vehicle for a fee. For this purpose, the motor vehicle can have an interface for coupling with a driving-services application which can be installed on a smartphone, for example. The driving-services application can be, for example, on a smartphone of the passenger who, by means of the driving-services application, requests a driving service from the motor vehicle with the tank pressure that is otherwise too high. Economical use of the excess hydrogen introduced into the tank is accordingly possible.

In particular, when the motor vehicle is an autonomous motor vehicle, filling of the hydrogen tank can take place autonomously. In this case, filling of the tank takes place fully automatically. The vehicle user of the autonomous motor vehicle then merely has to state, for example, when he would like to leave home in order that the motor vehicle automatically fills the hydrogen tank to the maximum.

It is further preferred that an expected second operating time at which the motor vehicle will be started up following the first operating time is determined, wherein the predicted maximum ambient temperature at the second operating time, for example at the first operating location, is ascertained. It can thereby be preferred that an expected second operating time at which the vehicle will be started up following the first operating time and optionally an expected second operating location at which the motor vehicle will be started up at the second operating time are determined, wherein the predicted maximum ambient temperature at the second location at the second operating time is ascertained. This can be expedient if, when the motor vehicle is first started up at the first operating time, only a short operation is planned or takes place, in which only a small amount of hydrogen from the hydrogen tank is used, and the second operating time is significantly later, so that the temperature of the hydrogen may be higher at this second operating time, so that the tank pressure could exceed the maximum possible tank pressure. It can be provided for this purpose that it is determined how much hydrogen the motor vehicle will use in the first operation at the first operating time.

Finally, it is also preferred that filling of the hydrogen tank with hydrogen takes place in two mutually alternating intervals, wherein in a first interval hydrogen flows into the hydrogen tank until a maximum permissible temperature of the hydrogen in the hydrogen tank is reached, and in a second interval no hydrogen flows into the hydrogen tank so that the hydrogen in the hydrogen tank with the maximum permissible temperature can cool down. The maximum permissible temperature can be, for example, in the range of from 80 to 90° C., in particular 85° C.

Consequently, the first interval and the second interval alternate. It can thereby be avoided that the maximum permissible temperature is exceeded. The second interval can be accelerated by actively cooling the hydrogen in the hydrogen tank. Alternatively and/or additionally, the hydrogen can be precooled, for example to a range of from −20° C. to −50° C., in particular to −40° C., before it flows into the hydrogen tank. With corresponding precooling, intermittent filling can optionally be dispensed with.

According to a second aspect, the invention relates to a motor vehicle comprising a hydrogen tank, a fuel cell drive and a control system for controlling filling of the hydrogen tank, wherein the control system is adapted to carry out a method according to the first aspect of the invention.

BRIEF DESCRIPTION OF THE DRAWINGS

The invention will be explained in greater detail hereinbelow with reference to the accompanying drawing. All the features which follow from the claims, the description or the figure, including structural details, can be essential to the invention both on their own and in any different combinations. In the drawing, in each case diagrammatically:

FIG. 2 is a graphical representation of a method according to the invention for refueling the motor vehicle from FIG. 1.

DETAILED DESCRIPTION

Figure 1:
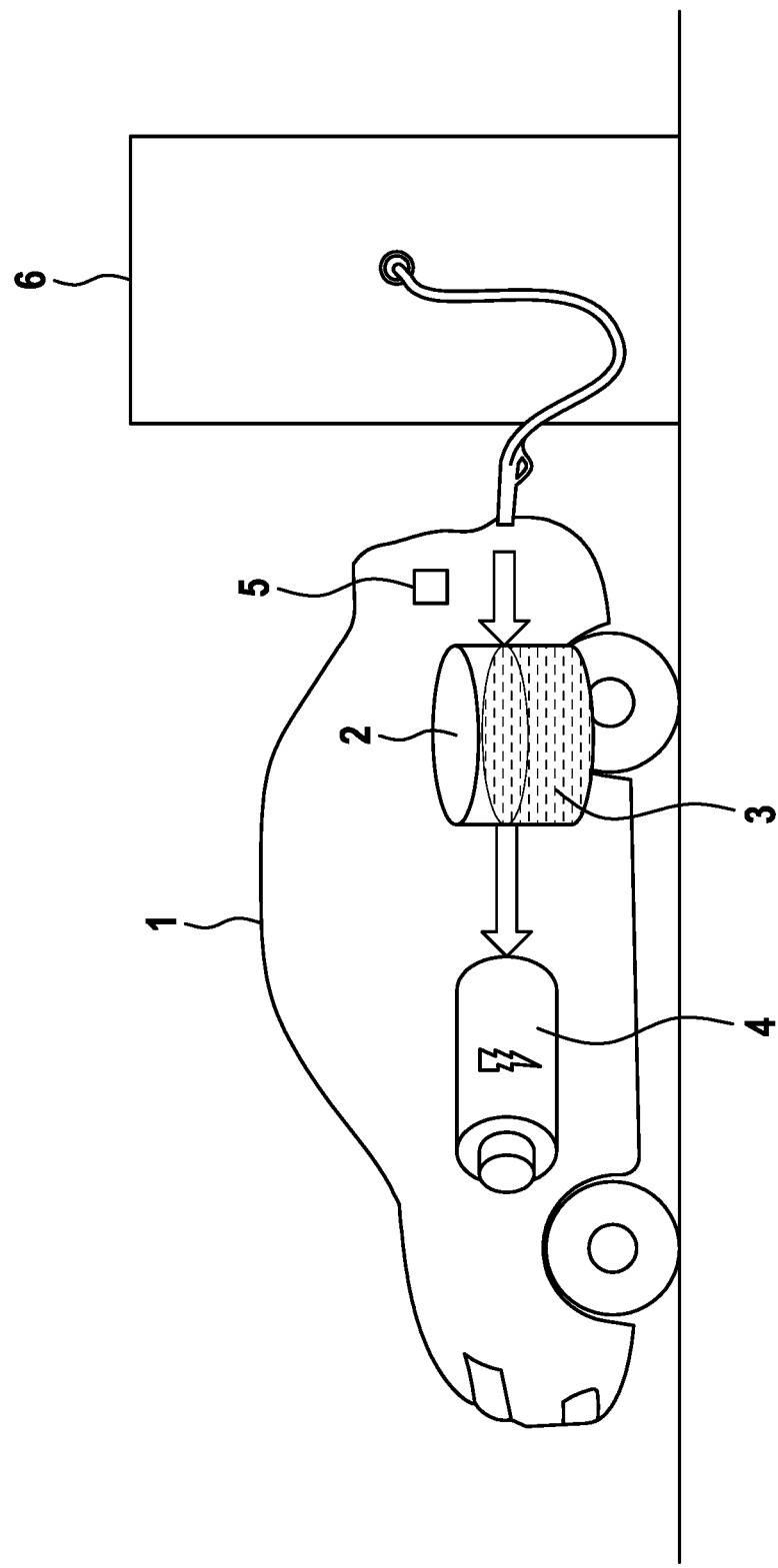
FIG. 1 is a perspective side view of an exemplary embodiment of a motor vehicle according to the invention during refueling.

Elements having the same function and effect are provided with the same reference signs in each of FIGS. 1 and 2.

FIG. 1 is a perspective side view of an exemplary embodiment of a motor vehicle 1 according to the invention comprising a fuel cell drive (not shown) during refueling at a hydrogen dispenser 6.

The hydrogen dispenser 6 is connected to the vehicle 1 by means of a hose and a dispenser nozzle. A hydrogen tank 2 of the motor vehicle 1 is filled with hydrogen 3 from the hydrogen dispenser 6.

The motor vehicle 1 further has a battery 4 and a control system 5. The battery 4 can be charged by means of the fuel cell drive and the hydrogen 3 from the hydrogen tank 2. The control system 5 serves to control the refueling process.

FIG. 2 is a graphical representation of a method according to the invention for refueling the motor vehicle 1 from FIG. 1.

The graphical representation shows a graph in which a flow S of hydrogen 3 into the hydrogen tank 2, or filling of the hydrogen tank 2 with hydrogen 3, the temperature T of the hydrogen 3 in the hydrogen tank 2 and the tank pressure p of the hydrogen 3 in the hydrogen tank 2 are shown. The time t of the refueling process is plotted on the abscissa. The temperature T and the tank pressure p of the hydrogen are plotted on the ordinate.

In a first interval I, hydrogen 3 is supplied to the hydrogen tank 2 by means of the flow S.1. The tank pressure p and the temperature T of the hydrogen 3 thereby increase. When or before the temperature T reaches a maximum permissible temperature $T_{max}$, the flow S.1 is stopped and the refueling process is paused.

There then follows a second interval II in which a time t is allowed to pass, during which the hydrogen 3 cools down. Cooling can actively be assisted.

The second interval II is again followed by a further first interval I in which hydrogen 3 is supplied to the hydrogen tank 2 by means of the flow S.2 until the maximum permissible temperature $T_{max}$ is reached. A second interval II then again follows.

This intermittent refueling process continues until a tank pressure p is reached that corresponds to a maximum permissible tank pressure $p_{max}$ at a predicted maximum ambient temperature $T_{U,max}$. The predicted maximum ambient temperature $T_{U,max}$ is a temperature that will be present at an expected first operating time and at an expected first operating location.

An exemplary application scenario will be explained in greater detail in the following text. The current ambient temperature (at about 1 o'clock at night) is TU=10° C. At this time, the motor vehicle 1 is to be refueled. The motor vehicle 1 is then predicted to be started up at 8 o'clock in the morning on the following day.

In order to determine how much hydrogen 3 can be introduced into the hydrogen tank 2, the maximum ambient temperature TU,max is predicted by the control system 5 on the basis of a weather forecast for 8 o'clock in the morning for the location at which the motor vehicle 1 is predicted to be started up. In the present case, it is TU,max=20° C. Accordingly, the hydrogen tank 2 can be filled with hydrogen 3 under the control of the control system 5 until a maximum permissible tank pressure pmax of, for example, 875 bar and a tank temperature of 20° C. is reached.

If, contrary to what was planned, the vehicle is then not started up at 8 o'clock in the morning as predicted and it is determined that the ambient temperature TU will rise above the predicted maximum ambient temperature TU,max=20° C., this would lead to an increase in the tank pressure above the maximum tank pressure pmax.

In order to avoid the maximum tank pressure $p_{max}$ being exceeded, the motor vehicle 1 can, for example, be started up in order to charge the battery 4, in order to drive autonomously, or hydrogen 2 can be discharged from the hydrogen tank 3 by means of a purge valve.

The invention claimed is:

1. A method for filling a hydrogen tank of a motor vehicle having a fuel cell drive, the method comprising providing a control system configured to:
    (a) determine a first predicted future operating time at which the motor vehicle is to be started up and a first operating location at which the motor vehicle is to be started up,
    (b) ascertain a predicted maximum ambient temperature (TU,max) at the first operating location at the predicted future first operating time, and
    (c) fill the hydrogen tank with hydrogen until a tank pressure (p) in the hydrogen tank reaches a maximum permissible tank pressure (pmax) at a tank temperature (T), wherein the following applies for the tank temperature (T): the tank temperature (T) corresponds to the predicted maximum ambient temperature (TU,max) or corresponds substantially to the predicted maximum ambient temperature (TU,max).

2. The method as claimed in claim 1, wherein the control system is configured to relieve the pressure in the hydrogen tank when it is determined that the tank pressure (p) will exceed the maximum permissible tank pressure (pmax).

3. The method as claimed in claim 2, wherein the control system is configured to ascertain whether the ambient temperature (TU) will exceed the tank temperature before the motor vehicle is started up, in order to determine whether the tank pressure (p) will exceed the maximum permissible tank pressure (pmax).

4. The method as claimed in claim 2, wherein the control system is configured to relieve the pressure by starting up the fuel cell drive in order to charge a battery of the motor vehicle.

5. The method as claimed in claim 2, wherein the control system is configured to relieve the pressure by discharging hydrogen from the hydrogen tank.

6. The method as claimed in claim 2, wherein the motor vehicle is an autonomous motor vehicle and the pressure is relieved by driving the motor vehicle autonomously.

7. The method as claimed in claim 1, wherein the control system is configured to determine an expected second predicted future operating time at which the motor vehicle will be started up following the first predicted future operating time, wherein the predicted maximum ambient temperature (TU,max) at the second predicted future operating time is ascertained.

8. The method as claimed in claim 1, wherein the filling of the hydrogen tank with hydrogen takes place in two mutually alternating intervals, wherein in a first interval hydrogen flows into the hydrogen tank until a maximum permissible temperature (Tmax) of the hydrogen in the hydrogen tank is reached, and in a second interval no hydrogen flows into the hydrogen tank so that the hydrogen in the hydrogen tank with the maximum permissible temperature (Tmax) can cool down.

9. A motor vehicle comprising a hydrogen tank, a fuel cell drive and the control system that is adapted to carry out the method as claimed in claim 1.

10. The method as claimed in claim 1, wherein the first predicted future operating time is defined by a vehicle user providing a time value as in input.

11. The method as claimed in claim 1, wherein the first predicted future operating time is during a following day.

12. The method as claimed in claim 11, wherein the first predicted future operating time is defined by a vehicle user providing a time value as in input.

13. The method as claimed in claim 1, wherein the first predicted future operating time is ascertained by the motor vehicle on basis of a use profile of the motor vehicle.

14. The method as claimed in claim 13, wherein the operating location is determined by GPS.

15. The method as claimed in claim 1, wherein the first predicted future operating time is capable of being passed without starting of the motor vehicle.

16. The method as claimed in claim 15, wherein the operating location is determined by GPS.

17. The method as claimed in claim 1, wherein the first predicted future operating time is provided by a vehicle user entering a time value to an external device that interfaces with the control system of the motor vehicle.

18. The method as claimed in claim 17, wherein the external device is a smartphone.

19. A method for filling a hydrogen tank of a motor vehicle having a fuel cell drive, the method comprising providing a control system configured to:

(a) determine a first predicted future operating time at which the motor vehicle is to be started up and a first operating location at which the motor vehicle is to be started up, (b) ascertain a predicted maximum ambient temperature (TU,max) at the first predicted future operating location at the first operating time, (c) fill the hydrogen tank with hydrogen until a tank pressure (p) in the hydrogen tank reaches a maximum permissible tank pressure (pmax) at a tank temperature (T), wherein the following applies for the tank temperature (T): tank temperature (T)=[maximum ambient temperature (TU,max); maximum ambient temperature (TU,max)+10 K], and (d) relieve the pressure in the hydrogen tank when it is determined that the tank pressure (p) will exceed the maximum permissible tank pressure (pmax), wherein the ambient temperature (TU) is the tank temperature before the start of operation of the vehicle.

* * * * *